United States Patent [19]

Carter

[11] Patent Number: 4,997,687

[45] Date of Patent: Mar. 5, 1991

[54] GLASS PANELS WITH 3-DIMENSIONAL APPEARANCE

[75] Inventor: Thomas M. Carter, Valencia, Pa.

[73] Assignee: PPG Industries, Inc., Pittsburgh, Pa.

[21] Appl. No.: 402,168

[22] Filed: Sep. 1, 1989

[51] Int. Cl.⁵ .............................................. B32B 3/00
[52] U.S. Cl. ...................................... 428/34; 428/195;
428/324; 427/272; 52/171; 52/235; 52/788; 52/812
[58] Field of Search ........................ 428/34, 195, 324;
430/311, 322; 350/259, 261, 281, 284; 52/171,
235, 788, 812; 427/272

[56] References Cited

U.S. PATENT DOCUMENTS

Re. 25,312  1/1963  Duncan et al. ...................... 501/71
3,296,004   1/1967  Duncan ............................... 501/71
3,869,198   3/1975  Ballentine .......................... 350/259
3,951,525   4/1976  Ballentine .......................... 350/259
4,093,754   6/1978  Parsons .............................. 427/272
4,133,919   1/1979  Parsons .............................. 427/272
4,199,358   4/1980  Parsons .............................. 430/322
4,394,064   7/1983  Dauson .............................. 350/264
4,478,905  10/1984  Neeely, Jr. ........................ 428/324
4,610,115   9/1986  Thompson, Jr. ................... 350/259

Primary Examiner—Patrick Ryan
Attorney, Agent, or Firm—Donna L. Seidel

[57] ABSTRACT

A patterned product having a three-dimensional appearance comprising a transparent substrate with a discontinuous pattern coating in combination with a second pattern coating on a separate surface is disclosed, along with a method for its production.

20 Claims, 2 Drawing Sheets

GLASS PANELS WITH 3-DIMENSIONAL APPEARANCE

BACKGROUND OF THE INVENTION

Curtainwall architecture comprises both vision areas and opaque areas referred to as spandrels. Spandrel areas are formed by panels which are either intrinsically opaque or made opaque by the inclusion of an opaque coating or backing material. Spandrel panels are generally employed to conceal portions of the structure of a building which are not aesthetically pleasing if visible from the exterior of the building. For example, spandrel panels may be used to conceal floor slabs, air conditioning equipment, heating ducts and so on. Spandrel panels may also be used to maintain privacy or security, e.g., at the ground level of a building.

A variety of spandrel panels that closely match or pleasingly contrast in color and reflectivity with adjacent transparent glass panels in curtainwall construction have been developed. Increasing use of highly reflective transparent metal and metal oxide coatings has led to the development of matching spandrel panels. U.S. Pat. No. 3,869,198 discloses spandrel panels provided with a transparent light and heat reflective coating on the outwardly glazed glass surface and a substantially opaque ceramic enamel coating adhered to the inwardly glazed glass surface. These spandrels provide for aesthetically matched vision and spandrel areas in curtainwall construction by utilizing a ceramic enamel coating which reflects light in the same spectral region as the light transmitted by the transparent coating and glass combination. U.S. Pat. No. 3,951,525 discloses spandrel panels with transparent light and heat reflective coatings on the inwardly glazed glass surface and with substantially opaque ceramic enamel coatings adhered to the transparent light and heat reflective coatings. The spandrels are aesthetically matched to vision areas in curtainwall construction by utilizing a ceramic enamel coating which reflects light in the same spectral region as light transmitted by the transparent coating.

In some architectural installations, it is desirable to have a spandrel panel which has a different surface appearance from the high reflectivity of a metal or metal oxide coating or the glossiness of glass. U.S. Pat. No. 4,394,064 to Dauson discloses a durable spandrel panel comprising a rigid panel substrate, a ceramic enamel coating of a desired color, and a transparent protective metal oxide overcoating. In some applications, the substrate is preferably transparent, so that the color of the ceramic enamel coating is visible from both the exterior and the interior of the building. Glass is a particularly desirable substrate.

Glass panels in applications such as sloped glazing, skylights, greenhouses and atria may desirably be patterned with opaque materials such as ceramic enamels in stripe, dot, triangle or any other abstract, geometric, pictorial or other pattern so that the panel, while still partially transparent, reduces the amount of incoming solar radiation. Such glass panels are commercially available from PPG Industries, Inc. and are sold as PATTERNLITE® glass panels.

U.S. Pat. Nos. 4,093,754; 4,133,919 and 4,199,358 to Parsons disclose a method of making decorative panels with a dual density pattern by successively masking different portions of the substrate in successive steps of e.g. sandblasting.

SUMMARY OF THE INVENTION

In some architectural installations, it is desirable to have a glass panel which has a three dimensional appearance. The present invention provides a durable glass panel comprising a transparent substrate, a discontinuous patterned coating on at least one surface thereof, and another patterned coating which may be either transparent or opaque, and/or either continuous or discontinuous, on another surface, of either the same or a separate substrate.

DESCRIPTION OF THE PREFERRED EMBODIMENTS

Figure 1:
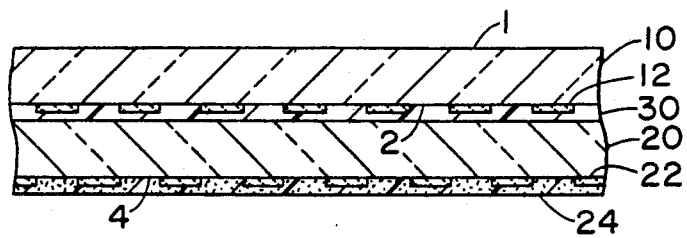
FIG. 1 illustrates an article having a discontinuous pattern 12 deposited on surface 2 of a transparent substrate 10. A second discontinuous pattern 22 is deposited on surface 4 of a second transparent substrate 20, covered by a solid background coating 24. The space 30 between substrates 10 and 20 in each figure may be a polymeric interlayer laminating the two substrates together, or a gas filled space separating the two substrates.

Preferred panels in accordance with the present invention comprise a transparent substrate with a discontinuous pattern of colored coating material deposited by a screen printing process combined with a second pattern coating on a separate surface deposited by any conventional coating process, preferably also screen printing. The panel substrate may be any suitable transparent material, but is preferably glass. Typical soda-lime-silica glasses are preferred. However, tinted glasses may also be employed, such as the heat-absorbing glasses sold by PPG Industries, Inc. under the trademarks SOLEX, SOLARBRONZE and SOLARGRAY, the latter two being described in U.S. Pat. No. 3,296,004 and U.S. Pat. No. Re. 25,312 respectively. The second pattern may be on the opposite surface of the substrate or on a surface of a separate substrate, and may be a continuous pattern coating.

In one preferred embodiment of the present invention, the discontinuous screen printed pattern is combined with a continuous pattern coating, which may be transparent or opaque, colored or reflective. In another preferred embodiment, the screen printed discontinuous pattern is combined with a second discontinuous pattern. By varying the angle of observation, the observer may see a changing pattern relationship, including, if desired, some through vision. In all its variations, the present invention provides glass panels with a three-dimensional appearance, i.e. an appearance of depth. This perception of depth may be intensified in a multi-pane panel by having the coatings on separate panes, and especially by having two discontinuous patterns combined with a mirror coating, preferably on a third surface. The printed pattern may comprise multiple colors applied in a plurality of screen printing process steps.

The preferred patterned panels of the present invention comprise at least two separate coatings, a discontinuous pattern coating produced by screen printing and a second discontinuous or continuous patterned, transparent or opaque, coating produced by any conventional method, preferably also screen printing.

In accordance with a preferred embodiment of the present invention, flat glass sheets supported on a horizontal conveyor are moved through a series of operations. First the glass sheets may be moved through a washer where detergent solutions and rotating brushes may be used to remove any dirt from the surface of the glass sheets, which are then dried with air. Next the glass is conveyed through a coating booth wherein a first coating composition is applied to the glass surface. The coating composition is preferably applied in a liquid vehicle, preferably a suspension of ceramic glass enamel colorants. The coated glass is preferably dried and fired, then subjected to a second coating process, preferably screen printing wherein a patterned coating is screen printed opposite the first coating, again preferably using ceramic glass enamel colorants. The screen printing process may be carried out in multiple steps using different screens and colorants to reproduce any particular pattern.

The ceramic enamel coating composition may comprise a ceramic frit such as lead borosilicate. Typical constituents in the ceramic enamels employed in the coatings for the spandrels of the present invention include oxides, nitrates, sulfates, carbonates or other compounds of aluminum, silicon, boron, lead, potassium, sodium, lithium, calcium, barium, zinc, magnesium, strontium and the like. Other constituents which may be present in the ceramic enamel to impart color or opacity to the ceramic enamel include pigment compounds of titanium, cobalt, manganese, chromium, copper, iron, lead, selenium, nickel, zinc, cadmium, gold, antimony, magnesium, zirconium and so on. Suitable ceramic enamel compositions are available in a variety of colors from commercial suppliers such as O. Hommel of Carnegie, Pa., or Drakenfeld of Washington, Pa.

Opaque ceramic enamel coatings in a wide variety of desirable colors may be prepared in accordance with the present invention. Preferred colors for the patterned screen printed coating include, in addition to black and white, green, brown, blue and gray for harmonizing with colored, reflective, transparent, coated glass windows, and red, yellow and blue for multiple screen printing to reproduce photographic images.

The ceramic enamel compositions are preferably applied to a glass substrate at room temperature, dried to evaporate the liquid vehicle, and fired to remove residual organic material and bond the coating to the substrate. The fired ceramic enamel has desirable color and reflectance properties, but is generally not sufficiently durable to be the exposed surface of an architectural installation. Therefore, in accordance with the present invention, for first surface applications, the ceramic enamel is overcoated with a metal oxide film which is more resistant to abrasion and weathering. A preferred metal oxide coating for this purpose is tin oxide. The protective metal oxide film is transparent and preferably essentially colorless in order to preserve the color of the opaque ceramic enamel.

In a preferred embodiment of the present invention, the ceramic enamels are overcoated with a metal oxide film by a pyrolytic technique, such as those described in U.S. Pat. Nos. 3,107,117 3,185,586; 3,660,061 and 4,263,335. The patterned ceramic enamel coated panel is contacted with an organometallic coating reactant capable of thermal decomposition to a metal oxide at a sufficiently high temperature to effect decomposition of the organometallic coating reactant to form a metal oxide film over the ceramic enamel coating. The metal oxide film is preferably transparent and colorless. A variety of metal oxides may be used, but tin oxide is preferred for its superior durability. The film thickness is sufficient to provide protection of the ceramic enamel without exhibiting an interference color. When tin oxide is used as the protective coating, a film thickness having a resistivity less than about 3000 ohms per square at the perimeter of the coated article, preferably less than 500 ohms per square, and most preferably 200 to 400 ohms per square at the center of the coated article, is preferred. A film in this thickness range provides substantial protection to the ceramic enamel frit without exhibiting any interference color.

While annealed coated products may be used in some applications, the preferred product in accordance with the present invention is at least partially tempered. In a most preferred embodiment, a glass substrate is coated with a patterned ceramic enamel coating, fired to fuse the ceramic, contacted with a thermally decomposable organometallic compound to pyrolytically deposit a metal oxide film, and then quenched to obtain a semi-tempered state. A second coating may be applied to the opposite surface, preferably before annealing or tempering. A second and even additional coatings may be applied to an additional glass pane.

In most preferred embodiments of the present invention, the pattern coating is not on an exposed exterior surface. In one most preferred embodiment, a first discontinuous pattern is on the surface of a glass sheet facing the interior of a multiple sheet panel. A second pattern may be on either the interior or exterior facing surface of a second sheet, wherein the second sheet is facing the interior of an enclosed space, such as a building. Such multiple sheet panels may comprise two or more glass and/or plastic sheets laminated together, or two or more glass and/or plastic sheets assembled parallel to each other with a space between their parallel surfaces. Panels may be constructed from a laminated panel spaced from a single panel, and so on.

The present invention will be more fully understood from the descriptions of specific examples which follow.

EXAMPLE I

A discontinuous pattern of ½ inch (1.27 centimeters) diameter holes, 11/16 inch (1.75 centimeters) on center with staggered rows is screen printed on a glass surface using a black ceramic enamel in a pine oil vehicle. Upon completion of the printing operation, the glass sheet passes through an infrared dryer with a pre-set temperature of 1100° F. The glass travels at a rate of 28 feet (8.5 meters) per minute through the dryer which is 25 feet (7.6 meters) long. Upon exiting the dryer, the glass is transferred to a horizontal roller hearth for firing the ceramic and heat strengthening the glass. A second plate is screen printed with the same hole pattern using a white ceramic enamel. After screening, drying, and firing in the same manner as the first plate, the second plate is then oversprayed directly on the pattern coated side with a black ceramic enamel in a water based spray vehicle. After spraying, the plate is conveyed through a roller hearth heat strengthening furnace for firing and strengthening. Upon cooling, the two plates of glass are assembled, one on top of the other, with a sheet of polyvinyl butyral between the plates. By use of a powerful light, the patterns on the two plates are aligned visually so that the hole pattern in the top plate—with the black pattern on the second surface—is exactly positioned over the hole pattern on the bottom plate—with the white hole pattern and black sprayed coating filling in the holes on the fourth surface. This assembly is processed through a laminating cycle of heat and pressure in an autoclave which causes the polyvinyl butyral to soften and flow, becoming clear and adhering to the two adjacent glass surfaces. Viewing the laminate straight on, the observer sees essentially solid black, as the black filled in holes in the white pattern are seen through the transparent holes in the black pattern. However, as the viewing angle deviates from 90°, the observer sees the white pattern through the holes in the black pattern, which gives the three dimensional appearance of cylinders. This example is illustrated in FIG. 1.

EXAMPLE II

Figure 2:
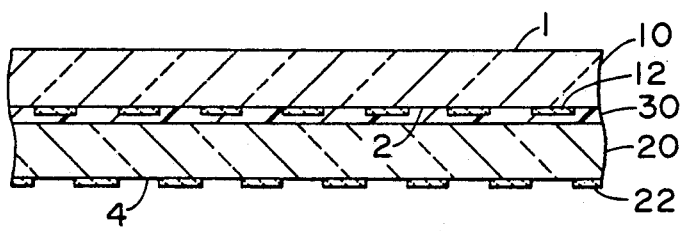
FIG. 2 illustrates an article as above without the solid background coating.

A discontinuous pattern is applied to a first glass surface, dried, and fired as in the previous example. Another discontinuous pattern is applied to another glass surface, dried, and fired. The two glasses are assembled with the patterns on the second and third surfaces of the unit. The glass sheets may be laminated as in Example I or spaced and sealed to form a double-glazed insulating unit. This example is illustrated in FIG. 2.

EXAMPLE III

Figure 3:
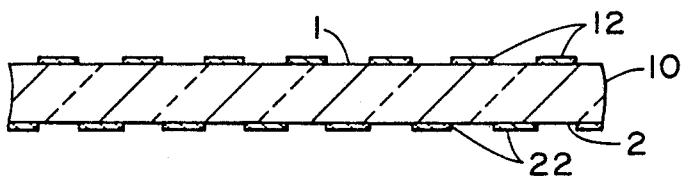
FIG. 3 illustrates a single substrate 10 with a first discontinuous pattern 12 on surface 1 and a second discontinuous pattern 22 on surface 2.

A discontinuous stripe pattern is applied to a first glass surface and dried. Another discontinuous pattern, offset from the first, is applied to the opposite glass surface, dried, and fired. Viewed straight on, the glass appears opaque. However, as the viewing angle deviates from 90°, the observer sees through the offset spaces. This example is illustrated in FIG. 3.

EXAMPLE IV

Figure 4:
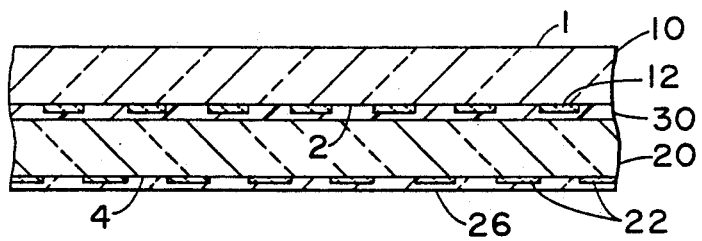
FIG. 4 shows an article comprising a first discontinuous pattern coating 12 on surface 2 of substrate 10 and a second discontinuous pattern 22 on surface 4 of substrate 20 overcoated with a transparent protective film 26.

A discontinuous pattern is applied to a glass surface, dried, and fired. Another discontinuous pattern is applied to another glass surface, dried, and fired. A transparent metallic film is applied over the fired pattern. The two glasses are assembled with the single pattern on the second surface and the pattern plus metallic film on the fourth surface. The two glass sheets may be laminated or spaced and sealed for insulated glass units. This example is illustrated in FIG. 4.

EXAMPLE V

Figure 5:
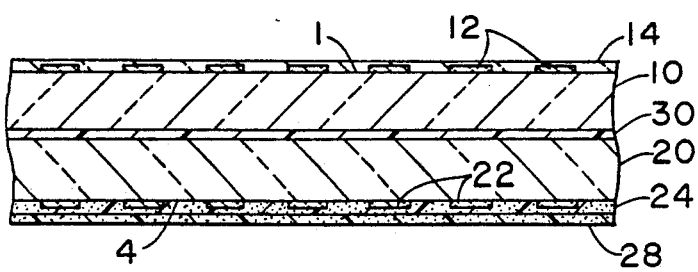
FIG. 5 shows an article with a first discontinuous pattern 12 on surface 1 of substrate 10 overcoated with a transparent protective film 14, and a second discontinuous pattern 22 on surface 4 of substrate 20 overcoated with a transparent reflective film 24 and covered with an opacifier layer 28.

A discontinuous pattern is applied to a glass surface, dried, and fired. A protective pyrolytic metal oxide overcoat is then applied directly on top of the pattern. Another discontinuous pattern is applied to another glass surface, dried, and fired. A transparent metallic film is applied directly over this pattern. An opacifier/protective layer is then applied over the metallic film. The glasses are then laminated with the pattern/protective overcoat on the first surface and the pattern/metallic film/opacifier on the fourth surface. This example is illustrated in FIG. 5.

EXAMPLE VI

Figure 6:
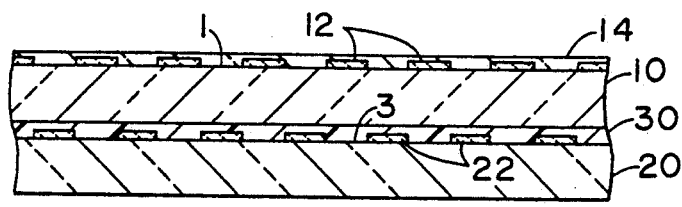
FIG. 6 shows an article with a first discontinuous pattern 12 on surface 1 of substrate 10 overcoated with a transparent protective film 14, and a second discontinuous pattern 22 on surface 3 of substrate 20.

Discontinuous patterns are applied to a surface of two glass sheets, dried, and fired. One pattern has a protective pyrolytic metal oxide overcoat applied directly on top of it. The two glasses are then laminated with the pattern/protective overcoat on the first surface and the second pattern on the third surface. This example is illustrated in FIG. 6.

EXAMPLE VII

Figure 7:
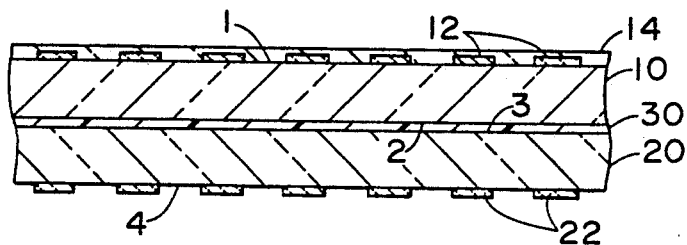
FIG. 7 illustrates an article with a first discontinuous pattern 12 on surface 1 of substrate 10 overcoated with a transparent protective film 16, and a second discontinuous pattern 22 on surface 4 of substrate 20.

A discontinuous pattern is applied to a glass surface, dried, and fired. A protective pyrolytic metal oxide film is applied directly on top of the fired pattern. Another discontinuous pattern is applied to another glass surface, dried, and fired. The two glasses are then laminated with the pattern plus protective film on the first surface, and the other pattern on the fourth surface. This example is illustrated in FIG. 7.

EXAMPLE VIII

Figure 8:
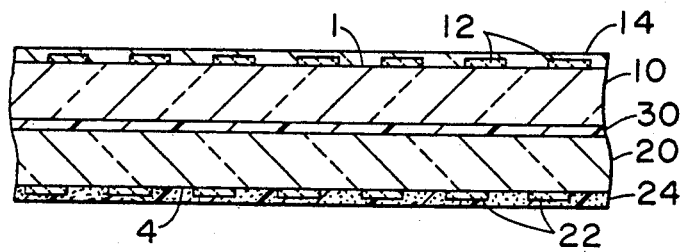
FIG. 8 illustrates an article with a first discontinuous pattern 12 on surface 1 of substrate 10 overcoated with a transparent protective film 14, and a second discontinuous pattern 22 on surface 4 of substrate 20 overcoated with a solid background coating 24.

A discontinuous pattern is applied to a glass surface, dried, and fired. A protective pyrolytic metal oxide overcoat is then applied directly on top of the pattern. Another discontinuous pattern is applied to another glass surface, dried, and overcoated with a solid flood coat of another color, dried, and fired. The two glasses are laminated with the pattern/protective overcoat on the first surface and the pattern/solid flood coat on the fourth surface. This example is illustrated in FIG. 8.

EXAMPLE IX

Figure 9:
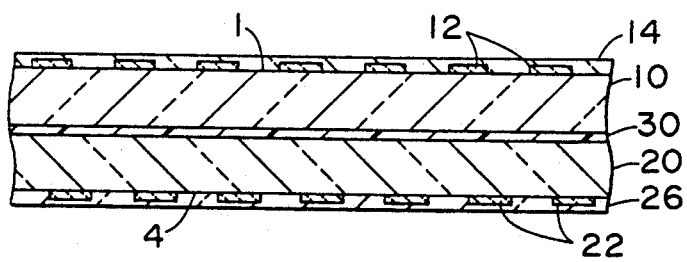
FIG. 9 shows an article with a first discontinuous pattern 12 on surface 1 of substrate 10 overcoated with a transparent protective film 14, and a second discontinuous pattern coating 22 on surface 4 of substrate 20 overcoated with a transparent reflective film 26.

A discontinuous pattern is applied to a glass surface, dried, and fired. A protective pyrolytic metal oxide overcoat is applied directly on top of the pattern. Another discontinuous pattern is applied to another glass surface, dried, and fired. A transparent metallic film is applied directly over this pattern. The glasses are then laminated with the pattern/protective overcoat on the first surface and the pattern/metallic film on the fourth surface. This example is illustrated in FIG. 9.

EXAMPLE X

Figure 10:
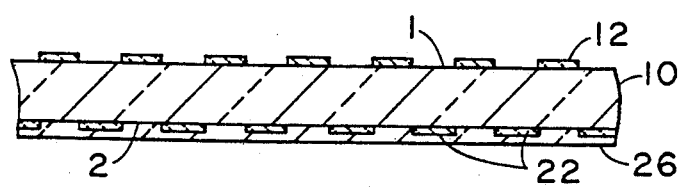
FIG. 10 shows an article with a single substrate 10 with a first discontinuous pattern 12 on surface 1 and a second discontinuous pattern 22 on surface 2 overcoated with a transparent film 26.

A discontinuous pattern is applied to a glass surface and dried. A second discontinuous pattern is applied to the opposite surface and dried. A single firing is used for both pattern coatings. The pattern coated surface to be exposed to the exterior is then coated with a transparent protective coating. This example is illustrated in FIG. 10.

The above examples are offered to illustrate the present invention. A wide variety of colorants may be employed in the screen printing process, and the screens may be prepared from abstract, pictorial, geometric or other created artwork as well as photographically from natural materials such as granite, and marble, as well as man-made materials. The patterned coating may be applied by methods other than screen printing, such as roll or pad printing. While tin oxide is a preferred protective coating for first surface applications, other metal oxides may be employed as well as clear frits, inorganic polymers or other protective coatings. While at least one coating is discontinuous, and preferably opaque, second and additional coatings may be continuous, transparent and/or mirror reflective. The scope of the present invention is defined by the following claims.

I claim:

1. An article of manufacture for use as an architectural product having a three-dimensional appearance comprising:
   a. a transparent substrate;
   b. a discontinuous pattern coating on one surface of said substrate said pattern comprising transparent areas; and
   c. a second pattern coating on a second surface, wherein said second pattern coating is visible through said discontinuous pattern coating.

2. An article according to claim 1, wherein said transparent substrate is glass.

3. An article according to claim 2, wherein said discontinuous pattern coating comprises ceramic enamel colorants.

4. An article according to claim 3, wherein said discontinuous pattern coating is applied by screen printing.

5. An article according to claim 4, wherein said second coating is a discontinuous pattern coating.

6. An article according to claim 4, wherein said second pattern coating is a continuous coating.

7. An article according to claim 6, wherein said second pattern coating is opaque.

8. An article according to claim 7, wherein said second pattern coating is on a surface of a second substrate.

9. An article according to claim 5, wherein said second pattern coating is deposited on a surface of a second substrate.

10. An article according to claim 9, wherein a third reflective coating is deposited on a surface whereby it reflects a discontinuous pattern coating.

11. A method for producing a pattern coated product with a three-dimensional appearance comprising the steps of:
    a. applying a discontinuous pattern coating onto a first surface of a transparent substrate said pattern comprising transparent areas; and
    b. applying a second pattern coating onto a second surface of a substrate, whereby said second pattern coating is visible through said discontinuous pattern coating.

12. A method according to claim 11, wherein said first discontinuous pattern coating and second pattern coating both comprise ceramic enamel colorants.

13. A method according to claim 12, wherein said discontinuous pattern coating is applied to the substrate by screen printing and said second coating is also a discontinuous pattern coating.

14. A method according to claim 12, wherein said second pattern coating is applied on the opposite surface of said transparent substrate.

15. A method according to claim 12, wherein said second coating is continuous.

16. A method according to claim 15, wherein said second pattern coating is opaque.

17. A method according to claim 11, wherein said second pattern coating is deposited on a surface of a second substrate.

18. A method according to claim 17, wherein said second substrate is glass.

19. A method according to claim 17, wherein said second pattern coating is continuous.

20. A method according to claim 11, further comprising the step of applying a reflective coating to a surface of a substrate which reflects said discontinuous pattern coating.

* * * * *